Sept. 27, 1949.  E. M. SORENSEN  2,482,804
FREQUENCY MEASURING DEVICE AND REMOTE-CONTROL SYSTEM
Original Filed May 16, 1940  4 Sheets-Sheet 1
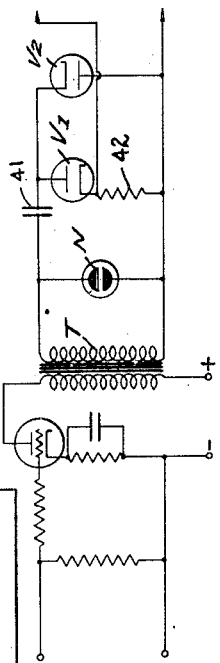
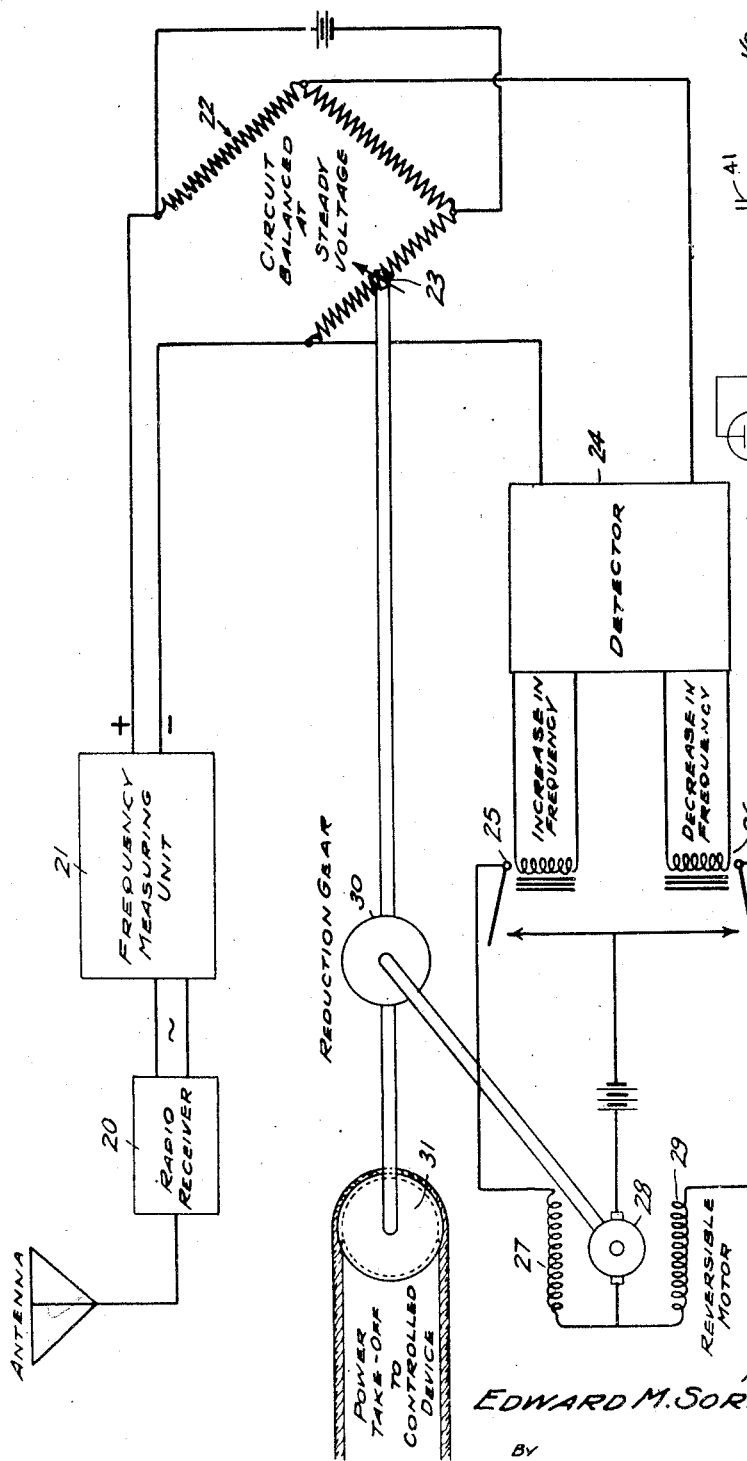
INVENTOR
EDWARD M. SORENSEN
BY
William D. Hall
ATTORNEY

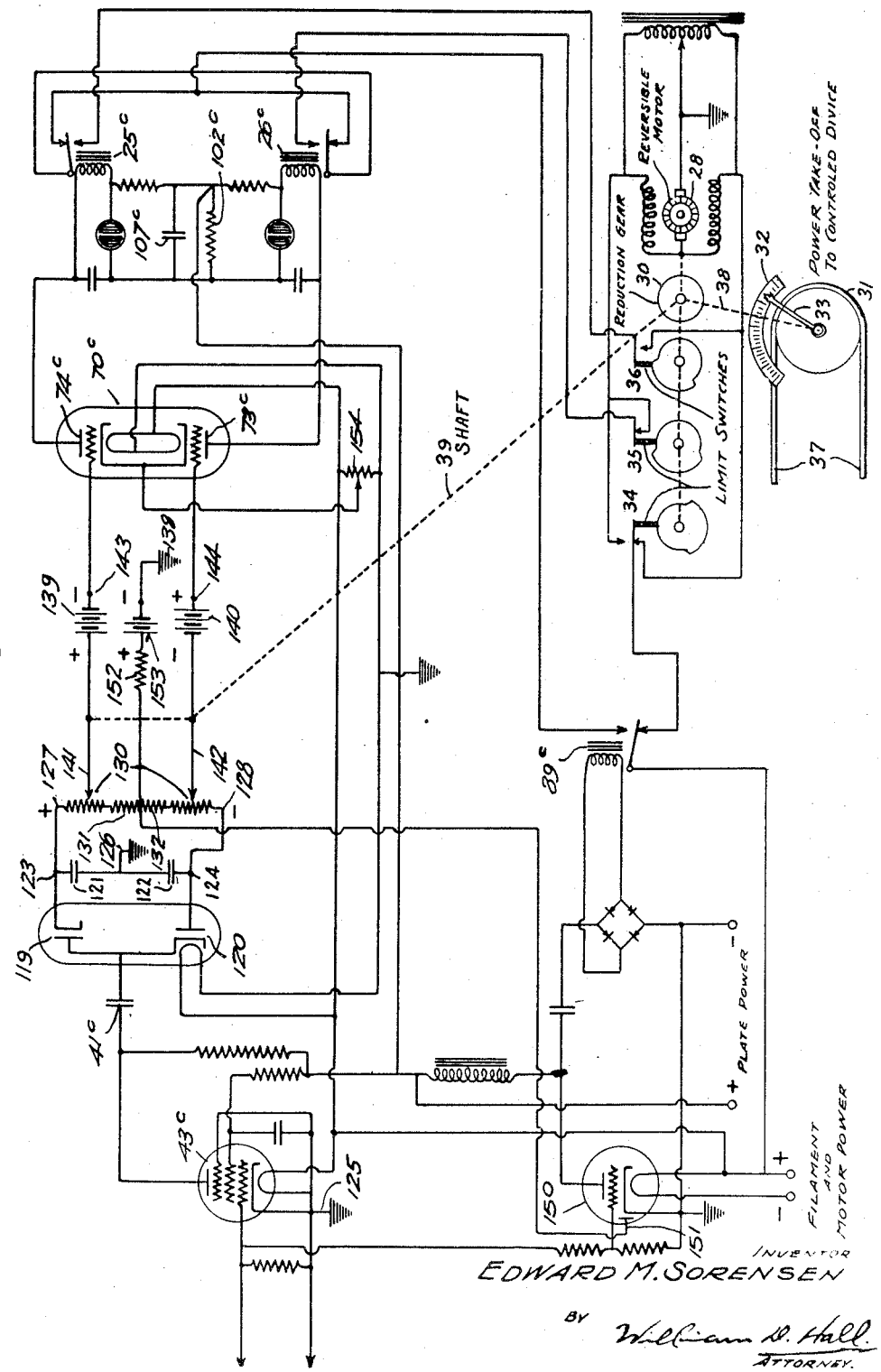

Sept. 27, 1949.    E. M. SORENSEN    2,482,804
FREQUENCY MEASURING DEVICE AND REMOTE-CONTROL SYSTEM
Original Filed May 16, 1940    4 Sheets-Sheet 3
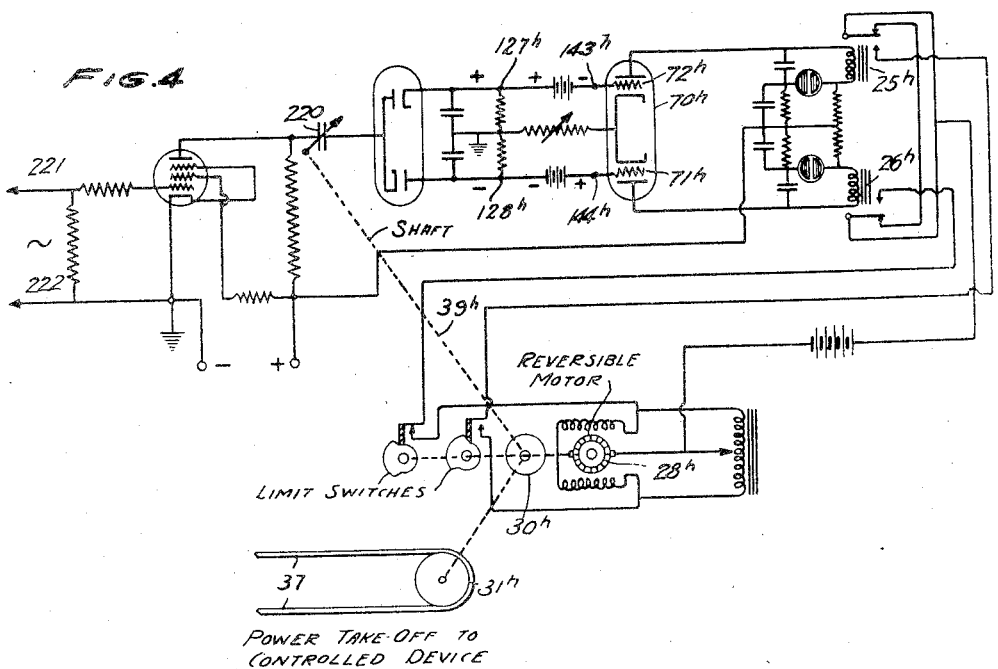
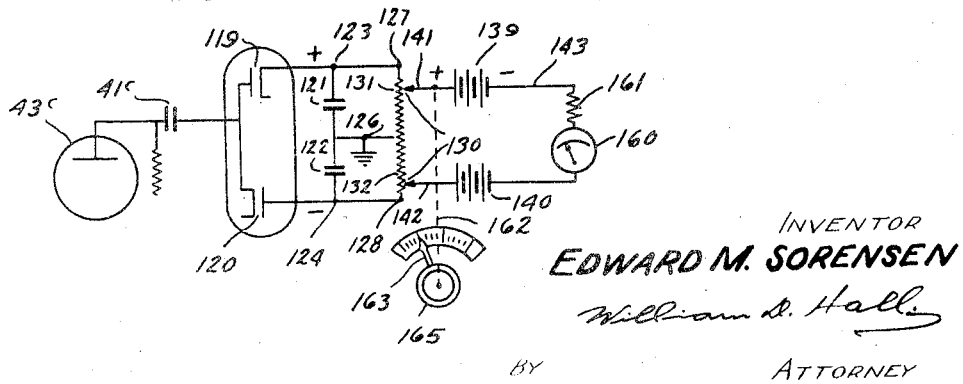
INVENTOR
EDWARD M. SORENSEN
William D. Hall
BY    ATTORNEY Sept. 27, 1949.  E. M. SORENSEN  2,482,804
FREQUENCY MEASURING DEVICE AND REMOTE-CONTROL SYSTEM
Original Filed May 16, 1940  4 Sheets-Sheet 4
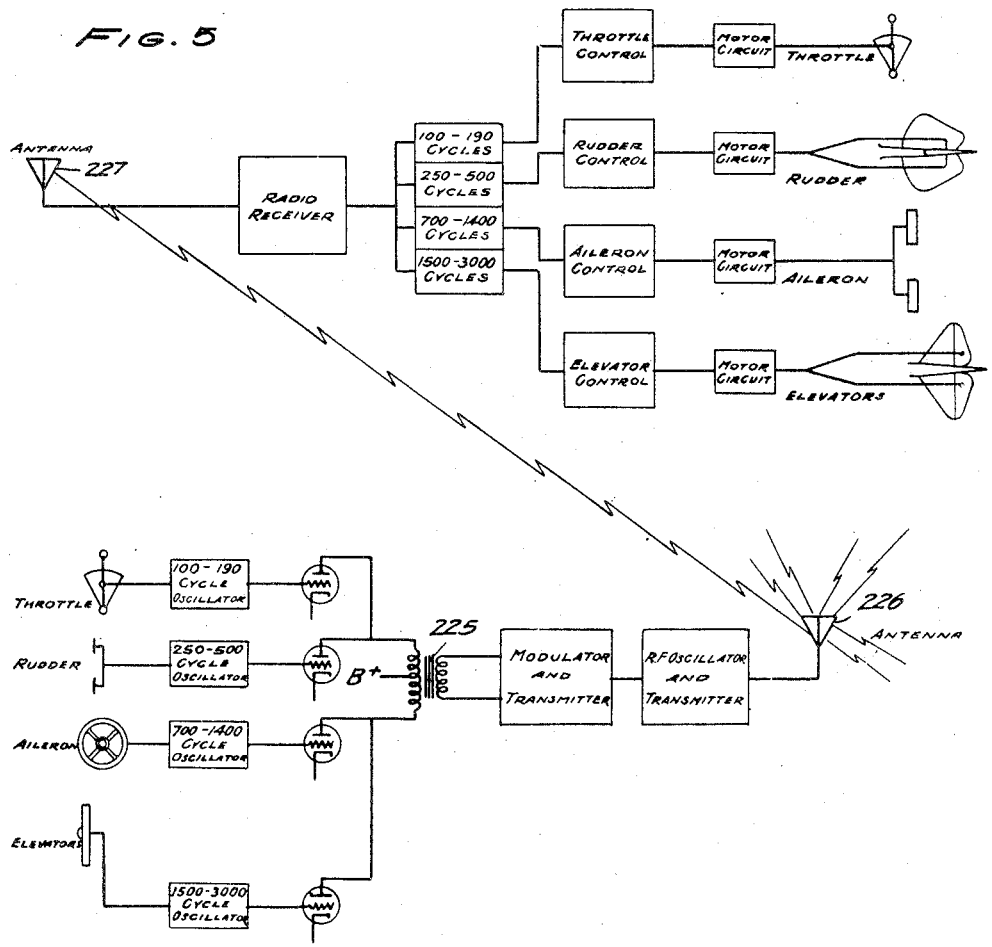
INVENTOR
EDWARD M. SORENSEN
William D. Hall
BY  ATTORNEY Patented Sept. 27, 1949

2,482,804

UNITED STATES PATENT OFFICE 2,482,804

FREQUENCY MEASURING DEVICE AND REMOTE-CONTROL SYSTEM

Edward M. Sorensen, Dayton, Ohio

Original application May 16, 1940, Serial No. 335,517. Divided and this application March 24, 1941, Serial No. 385,028

11 Claims. (Cl. 318—28)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to remote control systems and provides means for the control of a device or system located remotely from the source of control transmission, and is particularly described herein with reference to a construction for the control of a rotatable device, such as is adapted to be used in the controls of an airplane.

This application is a division of my application Serial No. 335,517 filed May 16, 1940, and entitled "Radio remote control system."

Remote control systems and apparatus are well known, but the devices heretofore used for this purpose have been subject to certain definite limitations. One class of remote control equipment, such as is commonly used in telemetering circuits, is satisfactory for the purpose intended and is capable of reproducing a continuously variable indication as made by a meter pointer, for example. However, this class of equipment is not useful for performing work, inasmuch as means have not been provided for operating a power means in accordance with the signals reproduced. Another class of remote control equipment which has generally been used for operating power means at a remote point to correspond with the stimulus or stimuli applied to the control point comprises those systems commonly known as step-by-step or stop-and-go systems, in which a plurality of predetermined settings are made and then by the signalling of impulses corresponding to one of the predetermined settings, the controlled apparatus is made to respond to the position signalled. This system constitutes the principle of the automatic dial telephone. However, it is subject to several defects. One of these is that positions intermediate the pre-set positions can not be obtained. This is particularly objectionable where a continuous control of the controlled device is desired with very small increments of motion being applied to the controls, as would be required for operation of a remotely controlled airplane. Another defect is that if a large number of pre-set positions are attempted to be provided in order to reduce to a minimum the limitations of the previous defect, then the apparatus used becomes increasingly complicated, resulting in expensive equipment, the greater probability of failure due to the failure of any one of the larger number of elements used, and the increase in weight of the equipment. It will be obvious that for aircraft use, the weight of the equipment should be kept to a minimum. Still another class of remote control equipment depends for its operation upon the principle of the autosyn motor, but this type of equipment has the limitation that it can not be used as a torque amplifier or, in other words, that no more power can be obtained from the controlled device than what is applied to the control.

It is therefore an object of the invention to provide a remote control which will give continuously variable operation of the controlled device, and will be capable of energizing or utilizing any amount of power at the controlled device, regardless of the energy applied to the control.

In carrying out this object I employ a frequency measuring unit of improved character which converts variable frequencies into voltages with a magnitude proportional to the frequency converted and independent of the amplitude changes of the frequencies above a threshold value. The output of said frequency measuring unit is coupled to a circuit having characteristics such that it is balanced by a steady voltage output of said frequency measuring unit, but is adapted to be unbalanced by any changes in the voltage output, to an extent in proportion to said change. Thus, a change in the frequency transmitted will cause a change in the output voltage of the frequency measuring unit, which change of voltage will upset the balanced voltage, necessitating mechanical movement to reestablish same. The said mechanical movement is accomplished by a circuit network responsive to changes in the balanced condition and arranged to control the energization, direction of motion, and extent of motion of a power means geared to a mechanical element for rebalancing the voltage of the circuit connected to the output of the frequency measuring unit.

The arrangement is such that a frequency F creates a definite voltage E with a given angular setting of mechanical motion represented by the angle delta ($\Delta$). Any change of frequency F will result in a new voltage value E₁, upsetting the previous balance and causing mechanical rotation which in turn will reestablish a new balance whose angularity of mechanical rotation will be delta sub-1 (Δ₁), the direction of frequency change determining the direction of mechanical motion.

In this invention, as illustrated in the drawings, the mechanical motion is accomplished by employing the resultant change of voltage created by the change of frequency to operate a bridge or vacuum tube, to cause a motor controlled by relays, as more fully hereinafter described, to drive a mechanism such as potentiometer arms to rebalance the bridge and to compensate for the voltage change caused by the frequency change.

It is thus seen that a change in the frequency transmitted is converted in accordance with the invention to a mechanical motion proportional to the frequency change. Increase or decrease of the frequency transmitted determines the direction of mechanical motion. Thereafter, the mechanical motion can be utilized for any desired purpose by means of a power take off, and in the specific application shown, is adapted to be connected to aircraft controls by instrumentalities such as a pulley and cables or other suitable means.

The invention set forth in this divisional application pertains more specifically to the frequency measuring unit by which improved results are obtained in converting a change in the frequency transmitted to a mechanical motion proportional to the frequency change.

The invention will be better understood when reference is made to the following description in connection with the accompanying drawings in which:

Figure 1 is a schematic drawing showing the basic elements of the invention.

Figure 2 is a particular circuit for the frequency measuring unit shown in Figure 1.

Figure 3 is a modification of the circuit shown in Figure 1 to include a modified rectifier circuit in the frequency measuring circuit, and emission compensation circuit for the relay control elements and a proportionalizing circuit.

Figure 4 shows still another form of circuit in which the improved frequency measuring unit is advantageously employed.

Figure 5 schematically illustrates a remote control system for aircraft wherein signals for a plurality of controls are transmitted by a single radio carrier and all converted to direct current impulses by the improved frequency measuring unit in order to actuate the various control devices of the aircraft.

Figure 6 shows a current indicating instrument connection.

Referring to the drawings:

Figure 1 schematically shows the arrangement of the units of the controlled device as adapted for operation by radio signals. The output of the receiver 20 is connected to the frequency measuring unit 21, with or without amplification. The frequency measuring unit is shown with a direct current voltage output coupled to a bridge 22 having a potentiometer 23 as one arm thereof. Across the diagonals of the bridge is connected a detector unit 24 for detecting the extent to which the bridge is unbalanced, by changes in the output of the frequency measuring unit. The detector is of a type that is sensitive to the direction of current flow across the diagonal of the bridge and adapted to energize the relay 25 in response to one direction of current flow resulting from an increase in frequency of the received signal, and relay 26 in response to current flow in the other direction resulting from a decrease in frequency of the received signal. Relay 25 is adapted to in turn energize winding 27 of a power means in the form of a reversible motor 28, as illustrated, causing the motor to operate in one direction; and relay 26 is adapted to energize the other winding 29 of the motor, causing the motor to rotate in the opposite direction. The motor is connected to a reduction gear 30 which has a power take-off device, such as the pulley 31 illustrated, and is also mechanically connected to the arm of the potentiometer 23 in such a manner as to rotate the potentiometer in the direction necessary to reestablish the balance of the bridge.

In accordance with the principles of operation heretofore described, it will be understood that for each given frequency, the frequency measuring unit will have a given value of voltage output. It will further be seen that the bridge 22 is adapted to be balanced by a steady voltage output of the frequency measuring unit, and to be unbalanced in one direction or the other in response to an increase or decrease in the voltage output of the frequency measuring unit; that the motor is quiescent when the bridge is balanced; but that by means of the detector and relays the unbalanced condition is utilized to energize the motor to rebalance the bridge and that in rebalancing the bridge, the motion of the motor is utilized to provide the power for the desired remote control through reduction gear 30, pulley 31 and belt 37.

The invention is not limited to any particular frequency measuring unit 21 but an improved type in which highly advantageous results have been obtained is shown in Figure 2. There is used in combination with the frequency measuring unit, a rectifier so as to provide a direct current output.

The frequency measuring circuit shown in Figure 2, as well as the other frequency measuring circuits shown in following modifications, provide a voltage output which is proportional to frequency and not affected by amplitude above a threshold value. Their operation depends upon converting the applied alternating voltage to a substantially square top wave and by the use of a capacity 41 and resistor 42 as a frequency timing network. The output voltage of the frequency measuring unit is dependent upon the charge and discharge of said capacity, said charge and discharge being accomplished by the square top wave generating device. The frequency range that can be measured will be limited by the value of capacity used, thereby necessitating different values of capacities for different upper frequency limits. This limitation is determined by the length of time it takes the condenser 41 to acquire its charge through a given value of resistance 42, this time constant being a fixed value dependent upon the value of the capacity and the resistor. Thus, it can be readily seen that the length of time the alternating voltage is positive or negative is solely dependent upon its frequency, thereby automatically controlling the size of capacity that would be used in this circuit for a given maximum frequency. It will therefore be obvious that the capacitance of the condenser 41 should be in inverse relation to the maximum value of the range of frequency which is to be employed. Likewise, it will be seen that it is desirable to limit the range of frequency to as small an amount as is feasible in connection with the sensitivity that is desired for the controlled device. In this connection, it may be pointed out that quite satisfactory sensitivity of control for aircraft use can be obtained by a frequency ratio of 1 to 1.8; that is, for a frequency range of 100 to 180 cycles, sensitivity of the rotatable member which is designed to be connected to the aircraft control member can be held within the reasonable accuracy required for this operation.

A neon bulb N is connected across the secondary of the transformer T. When the input voltage builds up to the flash E. M. F. of the neon bulb, the tube becomes conducting and limits the voltage rise. This effects a square wave across the secondary of transformer T in a manner well understood by those skilled in the art. When the lower end of the secondary of transformer T is negative, current flows through resistor 42, tube $V_1$ and condenser 41, charging the latter. The extent that the condenser 41 is charged depends upon the time available for charging, hence the frequency. If the frequency is high, the condenser will never become fully charged but will be alternately charged (through tube $V_1$) and discharged (through tube $V_2$) and will always remain on the lower part of its exponential charging curve. This will mean that the charging current will be high, hence the drop across resistor 42 will be high. If the frequency is low, the condenser will be charged well up on its exponential charging curve and the overall average charging current will be less than when high frequency is used. Hence the voltage output varies directly with frequency.

In Figure 3 the received signals from a remotely positioned transmitting station are received by the pentode 43c which is operated at saturation and functions as a limiter as is known in the art similar to neon tube N of Fig. 2. The output of pentode 43c is applied to timing condenser 41c and to the reversely connected rectifiers 119 and 110. Condensers 121 and 122 are connected in series arrangement across cathode terminal 123 of tube 119 and anode terminal 124 of tube 120. These condensers serve as filter condensers to filter out any alternating voltage which might be present from cathode 123 to ground or plate 124 to ground, and also serve to provide a conducting path for the electrons during the charge of the condensers 121 and 122. Since the one leg of the alternating current applied to this rectifier circuit through condenser 41c is connected to ground 125, a return ground connection 126 is connected to the output of the rectifier circuit at the junction between the two condensers 121 and 122.

It will thus be seen that the ouput terminals 127 and 128 of the rectifier circuit will have substantially equal and opposite polarities with respect to the ground reference 126, and that the voltage directly across these terminals is double the voltage of the alternating current which is applied to the rectifier circuit, so that in this manner the voltage supplied by the frequency measuring unit to the potentiometer has been rectified, amplified, and isolated above ground. This rectifier circuit also has the advantage of providing more linearity of response, i. e., for a frequency change of 2 to 1, there results a voltage change of 2 to 1.

In the balancing circuit connected to the output of the rectifier at points 127 and 128 and which is adapted to be balanced at a steady voltage output of the frequency measuring unit, a dual potentiometer 130 is used. Dual potentiometers 130 and resistors 131 and 132 serve as the load resistance for the rectifiers 119 and 120. The ground is used to assure a balance of the two potentials to the ground point, and is for the purpose of the radio control circuit. Batteries 139 and 140 have the same potential but are connected to the arms 141 and 142 of the dual potentiometer in opposite polarity arrangement so as to "buck" the potential existing across the potentiometer arms and will provide a desired potential across points 143 and 144 when the potential existing across the arms is at the desired relation to the potential of the batteries.

The advantage of a dual potentiometer in this circuit is that it provides an equal load on both sides of the rectifier circuit between arm 141 to ground and arm 142 to ground. Another reason for using dual potentiometers in this circuit is that it is difficult to obtain potentiometers of the wire wound variety having a high enough resistance in a single unit. Thus, it is advantageous to use two potentiometers, thereby getting twice the resistance and providing a satisfactory load impedance for the rectifier.

Twin triode detector tube 70c has its grids connected to the points 143 and 144 and functions in response to an unbalance of the potentiometer circuit to control the relay circuits to the motor.

A novel frequency meter constructed on these principles is shown in Figure 6. The circuit components to the left of points 143 and 144 are the same as in Figure 3. A meter 160 with a series resistance 161 is connected across the points 143 and 144 of Fig. 3. Then when the potential existing across the arms 141 and 142 of the potentiometer is equal to the battery potential, the potential or current across points 143 and 144 as read on the meter will be zero, but when the frequency is raised or decreased, the voltage output of the rectifier will increase or decrease respectively, causing a current to flow in the meter in a direction corresponding to the direction of voltage change. To nullify this current and bring the reading to zero, it is necessary to move the potentiometer arms manually as by knob 165 in a direction to bring about nullification of the current. By calibrating the potentiometer scale 164 in frequency, as shown by potentiometer pointer 163 attached to shaft 162, the frequency can be read directly on a dial.

The lower part of Figure 3 shows several circuits and devices which may be used in connection with the improved frequency measuring unit such as limit switches 34, 35, and 36 which function in a manner well known in the art but form no important part of the present invention, a detailed description of the same appears unnecessary.

Making the following assumptions, the operation of the modification as disclosed in Fig. 3 is as follows: Assume for example, that there is a potential of 25 volts across the output of the rectifier tube 120. Assume further that tube 70c has a plate current of equal value in each plate of the order of one milliampere. Assume further that the relays 25c and 26c, located in each of the plate circuits of tube 70 will remain closed with a current of two milliamperes. Assume that the grid potentials for the plate current will be —3 volts. This condition will exist as long as the potential of 25 volts exists across the output of the rectifier tube 120. Now, if a signal of lower frequency is applied to the grid of tube 43c a lower potential will exist across the output 127–128 of tube 120. When this lower potential exists, it causes a less negative potential to exist on the grid adjacent anode 73c of tube 70c, thus causing an increase of plate current in the plate 73c of said tube. It will be noted that under normal conditions with a grid potential at −3 volts, relays 25c and 26c are opened. When relay 26c is closed a voltage flows in the field of the motor associated with the power take off. This motor is connected so that this action will cause it to rotate in the direction to secure a potential, which will satisfy the grid voltage for a potential of −3 volts on each grid and vice versa for relay 25c, relay 25c being controlled by an increase of potential on the grid adjacent plate 74c. The normal grid potential is created by bias cells 139 to 140 in series with each grid. The static potential of these cells is different because of the fact that one potential going to the grid adjacent plate 73c has its plus side connected to the grid and its negative side connected to the grid return. Bias cell 139 had its negative side connected to the grid adjacent the plate 74c and its positive side connected to the grid return connected across resistor 131 for a different potential, which, in this case is 15 volts. This causes a potential of −3 volts to exist on the grid adjacent plate 73c to grid return point 132 and on the grid adjacent plate 74c to grid return point 132. In the event a potential change from 15 volts occurs across resistor 131, it will cause a lesser negative voltage to be present on one grid or the other, depending on which way the potential changes, i. e., if the voltage is less than 15 volts the grid adjacent plate 73c will have a less negative potential applied to it, the grid adjacent plate 74c having a more negative potential applied to it and vice versa. In the event the potential on a grid becomes less negative from the pre-set point, this will in turn cause an increase in plate current, relays 25c and 26c being so adjusted that a given increase in plate current will cause the arm to close, completing a circuit, to cause rotation of the motor.

Power for driving the desired remote control device is taken from motor 28 through reduction gear 30, shaft 38, pulley 31 and belt 37. Frequency indications may be obtained by mounting a pointer 33 on shaft 38 and providing a scale 32 calibrated in frequency.

Figure 4 depicts a circuit having basically the same elements as the circuit shown in Figure 3, but differs from the latter in that the voltage balancing device such as the potentiometer has been replaced by a variable capacity 220. The condenser 220 is secured to, as by a shaft, and rotatable with the reduction gear 30$^h$ mounted on the shaft of the motor 28$^h$. The motor is controlled by relays 25$^h$ and 26$^h$ through twin triode 70$^h$ which is controlled by the amount of voltage which exists between points 143$^h$ and 144$^h$, this part of the circuit being identical to that shown in Figure 3. The value of voltage appearing between points 143$^h$ and 144$^h$ is in accordance with the frequency of the signal voltage applied between points 221 and 222. Control of said voltage is accomplished by varying the value of condenser 220. Assuming the grids 72$^h$ and 71$^h$ of twin triode 70$^h$ are balanced at a negative 1 volt potential, then that condition makes relays 25$^h$ and 26$^h$ idle. For said negative 1 volt bias condition, assume that the potential between points 143$^h$ and 144$^h$ is 20 volts for some frequency being impressed at points 221 and 222. In the event there is a change in frequency between points 221 and 222, this will at once change the voltage between points 143$^h$ and 144$^h$. This also unbalances the voltage set up on grids 72$^h$ and 71$^h$, thereby making one grid more negative and one grid less negative. This causes the motor 28$^h$ to operate in a predetermined direction, thereby causing condenser 220 mechanically connected to motor to rotate in the direction necessary to acquire a value to reestablish the potential of twenty volts existing between points 143$^h$ and 144$^h$, at which time the voltage on grids 72$^h$ and 71$^h$ returns to its normal value of negative one volt, causing the relay to open and the motor to stop.

By disconnecting that part of the circuit prior to points 143$^h$ and 144$^h$ from the grids of twin triode tube 70$^h$, and attaching a meter in series with a resistance across said points, current flow or voltage across these terminals can be detected. Then, by calibrating the variable condenser in frequency, and adjusting same until the reading of the meter is a predetermined value, the frequency of the input signal across points 221 and 222 can be read upon a dial. This circuit when used as a frequency meter has as its advantages a high degree of accuracy and an exceedingly wide range of measurement.

Figure 5 shows schematically the apparatus and method of operation of same for a remotely controlled aircraft, in which control is provided for the throttles, rudders, ailerons, and elevators. The ground station (which might readily be installed in another aircraft used as the control) has four control elements representing and corresponding to the throttle, rudder, ailerons, and elevators. These control elements are mechanically connected to four oscillators having frequency ranges, as illustrated of 100 to 190, 250 to 500, 700 to 1400, and 1500 to 3000 cycles respectively. The output of these oscillators is fed to the grids of amplifying tubes and the output of the tubes is then mixed in the transformer 225, the output of the transformer being fed to a modulator and amplifier of any well known suitable design. The output of the amplifier is connected to modulate a radio frequency transmitter and is transmitted by means of antennae 226. The transmission is exactly that of radio communication and therefore it is obvious that the signal can be transmitted to any distance, being limited only by the power of the transmitting station, and the characteristics of the transmitter. The signal is received at the antennae 227 of the controlled aircraft and is applied to a radio receiver of any well known commercial design having good operating qualities. The output signal of the radio receiver is then fed to four band pass filters, each filter being selected to pass frequencies corresponding to the output of only one of the audio oscillators; that is, one filter passes frequencies of 100 to 190 cycles; a second filter passes only frequencies of 250 to 500 cycles; a third filter passes only frequencies of 700 to 1400 cycles; and a fourth filter passes only frequencies of 1500 to 3000 cycles. The outputs of these filters are connected to a control circuit such as described in Figure 3 for operating the throttle, rudder, ailerons, and elevators respectively. The power circuit such as used in Figure 3 is shown as a separate unit, as it will generally be convenient to so design it.

It will thus be seen that a movement of any one of the control elements will produce a corresponding movement of the corresponding aircraft control in the remotely controlled aircraft. The system requires only one radio transmitter and receiver, and operates on but a single carrier wave. For aircraft use, it will generally be found preferable to use for the power supply for the aircraft controls, the hydraulic power circuit of the aircraft, rather than using electrical power. Since aircraft which is provided with the so-called "automatic pilots" already have a hydraulic power circuit, it will be a simple matter to provide a fluid motor for operating the aircraft controls and to control the operation of the fluid motor by valves which are adapted to be actuated by the relays 25c and 26c of Figure 3, in the same manner as the motor of Figure 3 is controlled.

It will be understood that I desire to comprehend within my invention such modifications as come within the scope of the claims and the invention.

Having thus fully described my invention, what I claim as new and desire to secure by Letters Patent, is:

1. A device for measuring the frequencies of alternating voltages comprising a sharp cut-off electronic tube and having input and output circuits, a series capacitor and a pair of tube rectifiers reversely connected to said output circuit, and a pair of resistances connected between the cathode of one rectifier and the anode of the other rectifier, a pair of capacitors connected in series, bridging said resistances and having their mid-point grounded, adjustable taps to each of said resistances connected to a source of electromotive force in series with a current-indicating device to show when said electromotive force across resistor taps is balanced against said fixed electromotive force, and means for adjusting said resistance taps to establish a balance in said current-indicating instrument, said last-mentioned means being calibrated in terms of frequency.

2. In a frequency responsive device, means for limiting the peak voltage of the current to whose frequency a response is desired, said means having an output circuit, a capacitor in said output circuit, two half-wave rectifiers each connected to said output circuit and oppositely connected in relation therewith so as to conduct current on different half cycles respectively, a voltage divider with adjustable taps having its outer ends connected across the output anode and cathode of said rectifiers respectively, a pair of amplifiers each having an anode, cathode and grid and responsive respectively to the output potential appearing at said voltage divider taps, means for biasing the amplifier grids for normal equilibrium potential, and means for restoring said equilibrium potential when unbalanced by a change in input frequency, said restoring means including a relay in the plate circuit of each amplifier adapted to control a reversible motor and a mechanical connection from said motor adapted to move said voltage divider taps in a direction to restore equilibrium grid potentials and a position indicator calibrated in frequency positioned by said motor.

3. In a frequency responsive device, a source of alternating current electromotive force, first means for limiting the peak magnitude of said electromotive force, second means including a condenser connected to the output of said first-named means and including means for passing the output of said first-named means through said condenser, first half-wave rectifier means connected to the output of said second means, second half-wave rectifier means connected to the output of said second means to rectify current during the half cycle that the first-half-wave rectifier is non-conducting, a voltage divider having its outer ends across the outputs of said rectifiers respectively, an amplifier comprising two tubes each having an anode, a grid and a cathode, means connecting the middle terminal of said divider to the cathodes of said tubes, the last-named means including biasing means for said tubes, conducting means connected to said divider away from said middle terminal on one side thereof and also connected to one of said grids, the last-named means including means therein to bias the grid connected thereto, second conducting means connected to said divider away from said middle terminal on the other side thereof from said first-named conducting means, the second conducting means being connected to the other grid and including means to bias such grid to a substantially different degree than the normal bias placed on the other grid by its biasing means, means applying plate potential to said anodes respectively, and means responsive to the difference in the current flowing to said anodes respectively.

4. In a frequency responsive device, a thermionic tube having an input circuit to which the frequency to be responded to is fed and having an output circuit and including means to limit the peak voltage of the frequency passing through said tube, a capacitor in said output circuit, two half-wave rectifiers each connected to said output circuit and oppositely connected in relation thereto so as to conduct current on different half cycles respectively, a pair of resistors bridged across the output anode and cathode and provided with mechanically adjustable voltage divider taps, a pair of amplifier tubes each having an anode, cathode and grid and input and output circuits, said input circuit including the adjustable voltage divider taps and means for biasing the grids for normal equilibrium potential, said output circuit including relay means in the plate circuit of each amplifier for controlling a reversible motor, a mechanical connection from said motor adapted to move the adjustable voltage divider taps in a direction to restore equilibrium potential when unbalanced by a change in input frequency, and means for transmitting changes in motor position to the frequency controlled device.

5. In a frequency responsive device, means for limiting the peak voltage of the current to whose frequency a response is desired, said means having an output circuit, including a frequency measuring circuit comprising a series capacitor, two half-wave rectifiers oppositely connected to said output circuit so as to conduct current on different half cycles respectively, a pair of resistors bridged across the output anode and cathode each provided with an adjustable tap, a pair of capacitors connected in series with mid-point grounded and bridged across said rectifier output, a pair of amplifier tubes each having an anode, cathode and grid and input and output circuits, said input circuit including the adjustable voltage divider taps and means for biasing the grids for normal equilibrium potential, said output circuit including relay means in the plate circuit of each amplifier for controlling a reversible motor, a mechanical connection from said motor adapted to move the adjustable voltage divider taps in a direction to restore equilibrium potential when unbalanced by a change in input frequency, and means for transmitting changes in motor position to the frequency controlled device.

6. A device for measuring the frequency of alternating voltages, comprising a thermionic tube having an input and an output circuit and arranged so as to limit the peak voltage passing through said tube, a resistor and a capacitor in said output circuit, a pair of reversely connected rectifiers with output load resistors bridged across the output anode and cathode respectively and connected to receive the frequency output from said resistor and capacitor, taps on said resistors adapted to be adjusted by a reversible motor, a pair of amplifier tubes each having an anode, cathode and grid, said grids being connected to said adjustable-resistor taps and including therein a source of bias potential to determine the equilibrium potentials for each tube, relay means in the plate circuit of each amplifier tube adapted to operate said reversible motor in a direction to restore said equilibrium potential when unbalanced by a change in input frequency, and a reduction gear, a pointer and a dial calibrated in frequency to indicate said input frequency.

7. In a frequency measuring system, a thermionic tube having input and output circuits and arranged to limit the peak of voltage of the frequency passing through said tube, a timing network consisting of reactive and pure resistive elements connected to said output circuit, two half-wave rectifiers each connected to said network and oppositely connected in relation therewith so as to conduct electricity on different half cycles respectively, a pair of load resistors bridged across the output anode and cathode respectively, taps on said resistors adapted to be varied by a reversible motor, a pair of amplifier tubes each responsive to the output the one of said rectifiers, biasing means in the grid circuit of each amplifier to determine an equilibrium potential, relay means in the output circuit of each amplifier to control said reversible motor to restore said equilibrium potential when unbalanced by a change in input frequency, and a reduction gear provided with a pointer and a scale to indicate motor position, said scale being calibrated in input frequency.

8. In a system for controlling position in accordance with frequency, the combination comprising, means for limiting the peak of the input voltage, a pair of reversely connected half-wave rectifiers having a series capacitor in the input circuit and a pair of resistors bridged across the output anode and cathode and provided with adjustable voltage divider taps, a pair of amplifier tubes each having an anode, cathode and grid and input and output circuits, said input circuit including the adjustable voltage divider taps and means for biasing the grids for normal equilibrium potential, said output circuit including relay means in the plate circuit of each amplifier for controlling a reversible motor, a mechanical connection from said motor adapted to move the adjustable voltage divider taps in a direction to restore equilibrium potential when unbalanced by a change in input frequency, and means for transmitting changes in motor position to the frequency controlled device.

9. In a positioning system controlled by frequency, the combination comprising means for limiting the peak of the input control voltage, a pair of reversely connected rectifier tubes having input and output circuits, a series capacitor in the input circuit and a pair of resistors in the output circuit bridged across the output anode and cathode, and including variable taps for said resistors, a pair of capacitors connected in series and bridged across the resistor input terminals and having the mid-point grounded, a pair of amplifier tubes each having an anode, cathode and grid including means for biasing the grids for normal equilibrium potential and connected to said variable taps, means for restoring said equilibrium potential when unbalanced by a change in input frequency, said restoring means including relay means in the plate circuit of each amplifier adapted to control a reversible motor, a mechanical connection from said motor adapted to move said variable taps in a direction to restore equilibrium potential to the grids of said amplifiers, means for transmitting changes in motor position to the frequency controlled device, and indicator means calibrated in frequency positioned by said motor.

10. In a system for controlling position in accordance with frequency, the combination comprising, means for limiting the peak of the input voltage, a pair of reversely connected half-wave rectifiers having an adjustable capacitor in series with the input circuit and a pair of resistors bridged across the output anode and cathode, a pair of capacitors connected in series bridged across said resistors and having the mid-point grounded, a pair of amplifier tubes each having an anode, cathode and grid and input and output circuits, said input circuit including means for biasing the amplifier grids for a normal equilibrium potential and being connected to the aforesaid resistors, said output circuit including relay means in the plate circuit of each amplifier for controlling a reversible motor, a mechanical connection from the motor adapted to move said adjustable capacitor in a direction to restore equilibrium potential when unbalanced by a change in input frequency, and means for transmitting changes in motor position to the frequency controlled device.

11. In a positioning system controlled by frequency, the combination comprising means for limiting the peak of the input voltage, a pair of reversely connected rectifiers having input and output circuits, an adjustable capacitor in series with the input circuit and a pair of resistors in the output circuit bridged across the output anode and cathode, a pair of capacitors connected in series and bridged across the resistor input terminals and having the mid-point grounded, a pair of amplifiers each having an anode, cathode and grid including means for biasing the grids for normal equilibrium potential connected to said resistor input terminals, means for restoring said equilibrium potential when unbalanced by a change in input frequency, said restoring means including relay means in the plate circuit of each amplifier adapted to control a reversible motor, a mechanical connection from said motor adapted to move said adjustable capacitor in a direction to restore equilibrium potential to the grids of said amplifiers, means for transmitting changes in motor position to the frequency controlled device, and indicator means calibrated in frequency positioned by said motor.

EDWARD M. SORENSEN.

(References on following page)

REFERENCES CITED

The following references are of record in the file of this patent:

UNITED STATES PATENTS

| Number | Name | Date |
|---|---|---|
| 1,944,315 | Clapp | Jan. 23, 1934 |
| 2,022,790 | Sturdy | Dec. 3, 1935 |
| 2,113,011 | White | Apr. 5, 1938 |
| 2,137,859 | Schwartz et al. | Nov. 22, 1938 |
| 2,176,742 | LaPierre | Oct. 17, 1939 |
| 2,191,185 | Wolff | Feb. 20, 1940 |
| 2,206,896 | Higgins et al. | July 9, 1940 |
| 2,218,642 | Hathaway | Oct. 22, 1940 |
| 2,228,367 | Sanders, Jr. | Jan. 14, 1941 |
| 2,232,858 | Lane | Feb. 25, 1941 |
| 2,237,522 | Clark | Apr. 8, 1941 |
| 2,243,417 | Crosby | May 27, 1941 |
| 2,243,702 | Hansell | May 27, 1941 |
| 2,249,420 | Engbert et al. | July 15, 1941 |
| 2,284,476 | MacKay | May 26, 1942 |